(12) United States Patent
Kwon et al.

(10) Patent No.: US 8,121,108 B2
(45) Date of Patent: Feb. 21, 2012

(54) DATA SLOT ALLOCATION METHOD USED TO TRANSMIT UNCOMPRESSED AV DATA, AND METHOD AND APPARATUS FOR TRANSMITTING UNCOMPRESSED AV DATA

(75) Inventors: Chang-yeul Kwon, Yongin-si (KR); Se-young Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 543 days.

(21) Appl. No.: 11/723,632

(22) Filed: Mar. 21, 2007

(65) Prior Publication Data

US 2007/0280157 A1 Dec. 6, 2007

(30) Foreign Application Priority Data

Jun. 5, 2006 (KR) .................. 10-2006-0050499

(51) Int. Cl.
*H04J 3/24* (2006.01)
(52) U.S. Cl. .................. 370/349; 370/310; 370/345
(58) Field of Classification Search .................. 370/328, 370/218, 229, 432, 349, 345, 310
See application file for complete search history.

(56) References Cited

U.S. PATENT DOCUMENTS

| | | | | | |
|---|---|---|---|---|---|
| 5,535,214 | A | * | 7/1996 | Shiobara | 370/455 |
| 5,535,333 | A | * | 7/1996 | Allen et al. | 709/212 |
| 5,819,117 | A | * | 10/1998 | Hansen | 712/300 |
| 6,347,391 | B1 | * | 2/2002 | Uesugi et al. | 714/795 |
| 6,744,746 | B1 | * | 6/2004 | Bartelme | 370/329 |
| 6,788,937 | B1 | * | 9/2004 | Willenegger et al. | 455/434 |
| 6,885,862 | B1 | * | 4/2005 | Pearson | 455/419 |
| 7,370,252 | B2 | * | 5/2008 | Kim et al. | 714/723 |
| 7,583,709 | B2 | * | 9/2009 | Giannakopoulos | 370/537 |
| 7,756,002 | B2 | * | 7/2010 | Batra et al. | 370/208 |

(Continued)

FOREIGN PATENT DOCUMENTS

KR 10-2005-0003575 A 1/2005

(Continued)

OTHER PUBLICATIONS

IEEE Standard for Information technology—Telecommunications and information exchange between systems—Local and metropolitan area networks—Specific requirements Part 15.3: Wireless Medium Access Control (MAC) and Physical Layer (PHY) Specifications for High Rate Wireless Personal Area Networks (WPANs), Published on Sep. 29, 2003.*
Written Opinion dated Sep. 13, 2007.

*Primary Examiner* — Kent Chang
*Assistant Examiner* — Ronald Eisner
(74) *Attorney, Agent, or Firm* — Sughrue Mion, PLLC

(57) ABSTRACT

Provided is a method and apparatus for wirelessly transmitting large data in a more efficient and stable manner. In particular, provided is a data slot allocation method used to transmit uncompressed audio/video (AV) data. The data slot allocation method includes transmitting a first superframe during a first beacon period; receiving a data slot request frame from at least one wireless device, which belongs to a network, during a data slot reservation period included in the first superframe; transmitting a response frame to the at least one wireless device during the data slot reservation period in response to the data slot request frame; and transmitting a second superframe including one or more data slots allocated to the at least one wireless device during a second beacon period.

20 Claims, 13 Drawing Sheets

U.S. PATENT DOCUMENTS

| | | | |
|---|---|---|---|
| 2004/0075865 A1* | 4/2004 | Kato et al. | 358/1.16 |
| 2004/0264428 A1 | 12/2004 | Choi et al. | |
| 2005/0243751 A1 | 11/2005 | Yoon et al. | |
| 2005/0243794 A1 | 11/2005 | Yoon et al. | |
| 2006/0104241 A1 | 5/2006 | Han et al. | |

FOREIGN PATENT DOCUMENTS

| | | |
|---|---|---|
| WO | 2005-076544 A1 | 8/2005 |

* cited by examiner

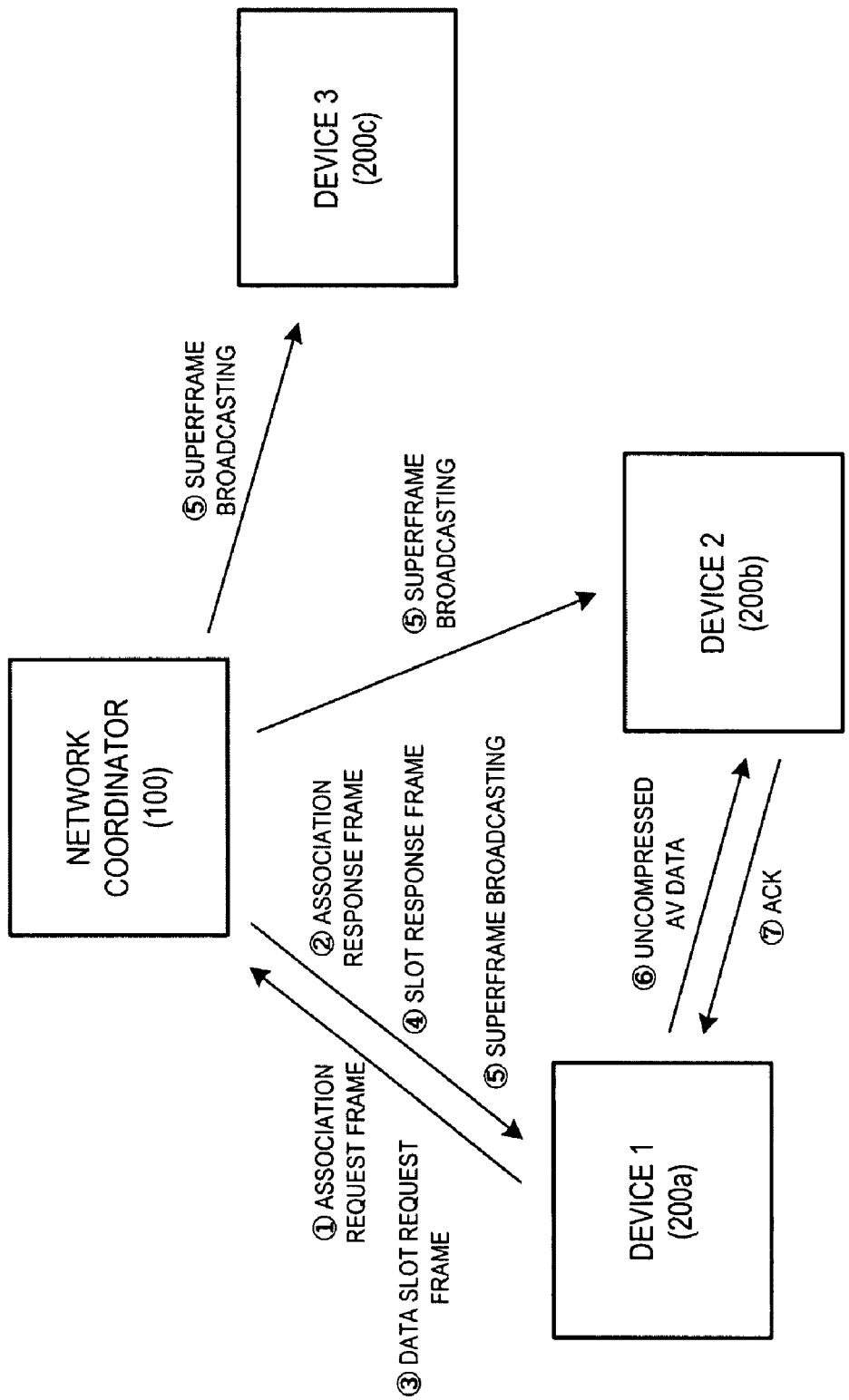

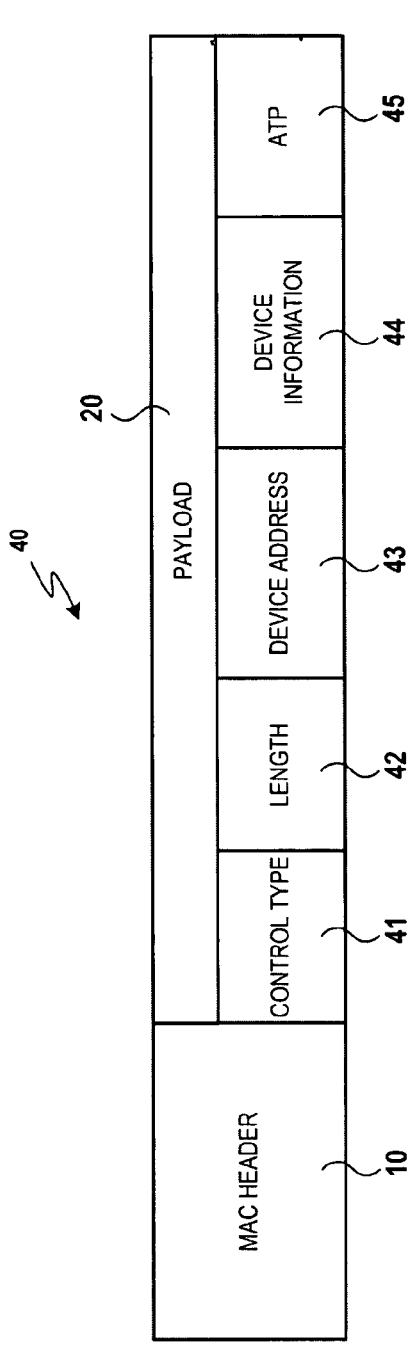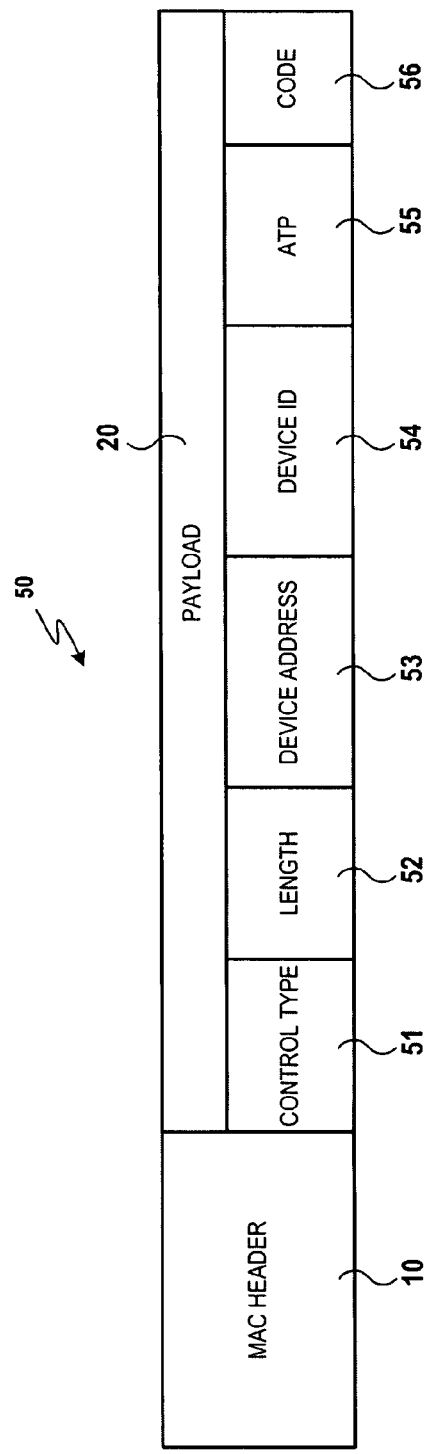

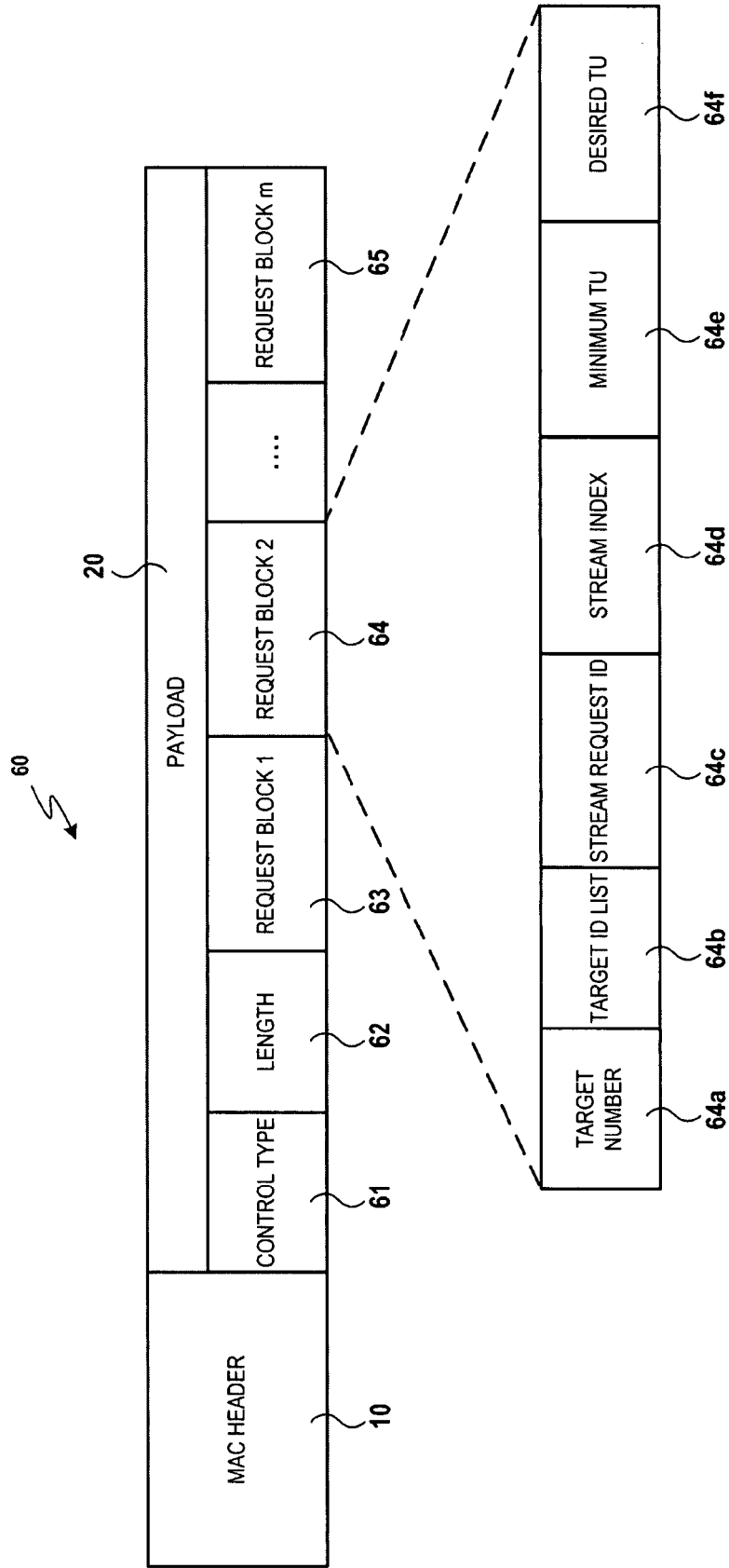

DATA SLOT ALLOCATION METHOD USED TO TRANSMIT UNCOMPRESSED AV DATA, AND METHOD AND APPARATUS FOR TRANSMITTING UNCOMPRESSED AV DATA

CROSS-REFERENCE TO RELATED APPLICATION

This application claims priority from Korean Patent Application No. 10-2006-0050499 filed on Jun. 5, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to wireless communication technology, and more particularly, to a wirelessly transmitting large data in a more efficient and stable manner.

2. Description of the Related Art

As networks become wireless and the demand for large multimedia data transmission increases, there is a need for studies on an effective transmission method in a wireless network environment. In a wireless network, a plurality of devices share given wireless resources. Therefore, if contention increases, there is a high possibility of losing valuable wireless resources due to collisions during communication. In order to reduce such collisions or losses and facilitate secure data transmission/reception, a contention-based distributed coordination function (DCF) or a contention-free point coordination function (PCF) is used in a wireless local area network (LAN) environment, and a time division method, such as channel time allocation, is used in a wireless personal area network (PAN) environment.

By applying these methods to a wireless network, collisions can be reduced to a certain degree, and stable communication can be achieved. However, the wireless network still has a greater possibility of collision between transmission data than a wired network. This is because a lot of factors that hinder stable communication, such as multi-path, fading and interference, are inherent in the wireless network environment. In addition, as the number of wireless devices that join the wireless network increases, problems, such as collisions and losses, are more likely to occur.

The collisions require retransmissions, which severely undermine the throughput of the wireless network. In particular, when a better quality of service (QoS) is required as in the case of audio/video (AV) data, it is very important to secure available bandwidth as much as possible by reducing the number of retransmissions.

Considering that various home devices are increasingly required to wirelessly transmit high-quality videos, such as digital video disk (DVD) videos or high definition television (HDTV) videos, it is time to develop a technological standard for seamlessly and consistently transmitting or receiving high-quality videos that require broad bandwidth.

An IEEE 802.15.3c task group is developing a technological standard for transmitting large-volume data over a wireless home network. The technological standard, which is called "millimeter wave (mmWave)," uses an electric wave having a physical wavelength of a millimeter (i.e., an electric wave having a frequency band of 30-300 GHz) to transmit large-volume data. This frequency band, which is an unlicensed band, has conventionally been used by communication service providers or used for limited purposes, such as observing electric waves or preventing vehicle collision.

FIG. 1 is a diagram comparing frequency bands of IEEE 802.11 series of standards and mmWave. Referring to FIG. 1, an IEEE 802.11b or IEEE 802.11g standard uses a carrier frequency of 2.4 GHz and has a channel bandwidth of approximately 20 MHz. In addition, an IEEE 802.11a or IEEE 802.11n standard uses a carrier frequency of 5 GHz and has a channel bandwidth of approximately 20 MHz. On the other hand, mmWave uses a carrier frequency of 60 GHz and has a channel bandwidth of approximately 0.5-2.5 GHz. Therefore, it can be understood that mmWave has a far greater carrier frequency and channel bandwidth than the conventional IEEE 802.11 series of standards.

When a high-frequency signal (a millimeter wave) having a millimeter wavelength is used, a very high transmission rate of several Gbps can be achieved. Since the size of an antenna can also be reduced to less than 1.5 mm, a single chip including the antenna can be implemented. Furthermore, interference between devices can be reduced due to a very high attenuation ratio of the high-frequency signal in the air.

However, the high-frequency signal has a short distance range due to the very high attenuation ratio. In addition, since the high-frequency signal is highly directional, it is difficult to have a proper communication in a non-line-of-sight environment. In mmWave, an array antenna having a high gain is used to solve the former problem, and a beam steering method is used to solve the latter problem.

Recently, a method of transmitting uncompressed data using mmWave in a high-frequency band of several tens of GHz has been introduced to home and office environments, along with a conventional method of transmitting compressed data using a band of several GHz of IEEE 802.11 Standards.

Since uncompressed AV data is large-volume data that is not compressed, it can be transmitted only in a high-frequency band of several tens of GHz. Even when having a packet loss, uncompressed AV data has relatively less effect on the quality of displayed video than compressed data. Therefore, there is no need for an automatic repeat request or a retry. In this regard, an efficient medium access method is required to efficiently transmit uncompressed AV data in a high frequency of several tens of GHz.

SUMMARY OF THE INVENTION

The present invention provides a method and apparatus for efficiently transmitting uncompressed audio/video (AV) data using a millimeter wave (mmWave) in a band of several tens of GHz.

However, the aspects of the present invention are not restricted to the one set forth herein. The above and other aspects of the present invention will become more apparent to one of daily skill in the art to which the present invention pertains by referencing a detailed description of the present invention given below.

According to an aspect of the present invention, there is provided a data slot allocation method used to transmit uncompressed AV data. The method includes transmitting a first superframe during a first beacon period; receiving a data slot request frame from at least one wireless device, which belongs to a network, during a data slot reservation period included in the first superframe; transmitting a response frame to the at least one wireless device during the data slot reservation period in response to the data slot request frame; and transmitting a second superframe including one or more data slots allocated to the at least one wireless device during a second beacon period.

According to another aspect of the present invention, there is provided a method of transmitting uncompressed AV data.

The method includes receiving a first superframe from a network coordinator during a first beacon period; transmitting a data slot request frame from at least one wireless device, which belongs to a network, to the network coordinator during a data slot reservation period included in the first superframe; receiving a second superframe including one or more data slots allocated to the at least one wireless device by the network coordinator during a second beacon period; and transmitting uncompressed AV data to another wireless device during a period corresponding to the data slots.

According to another aspect of the present invention, there is provided a data slot allocation apparatus used to transmit uncompressed AV data. The apparatus includes a unit transmitting a first superframe during a first beacon period; a unit receiving a data slot request frame from at least one wireless device, which belongs to a network, during a data slot reservation period included in the first superframe; a unit transmitting a response frame to the at least one wireless device during the data slot reservation period in response to the data slot request frame; and a unit transmitting a second superframe including one or more data slots allocated to the at least one wireless device during a second beacon period.

According to another aspect of the present invention, there is provided an apparatus for transmitting uncompressed AV data. The apparatus includes a unit receiving a first superframe from a network coordinator during a first beacon period; a unit transmitting a data slot request frame from at least one wireless device, which belongs to a network, to the network coordinator during a data slot reservation period included in the first superframe; a unit receiving a second superframe including one or more data slots allocated to the at least one wireless device by the network coordinator during a second beacon period; and a unit transmitting uncompressed AV data to another wireless device during a period corresponding to the data slots.

BRIEF DESCRIPTION OF THE DRAWINGS

The above and other features and advantages of the present invention will become more apparent by describing in detail exemplary embodiments thereof with reference to the attached drawings, in which:

FIG. 3 schematically illustrates an environment to which the present invention is applied;

FIG. 4 illustrates the configuration of an association request frame according to an exemplary embodiment of the present invention;

FIG. 5 illustrates the configuration of an association response frame according to an exemplary embodiment of the present invention;

FIG. 6 illustrates the configuration of a data slot request frame according to an exemplary embodiment of the present invention;

DETAILED DESCRIPTION OF THE INVENTION

Figure 1:
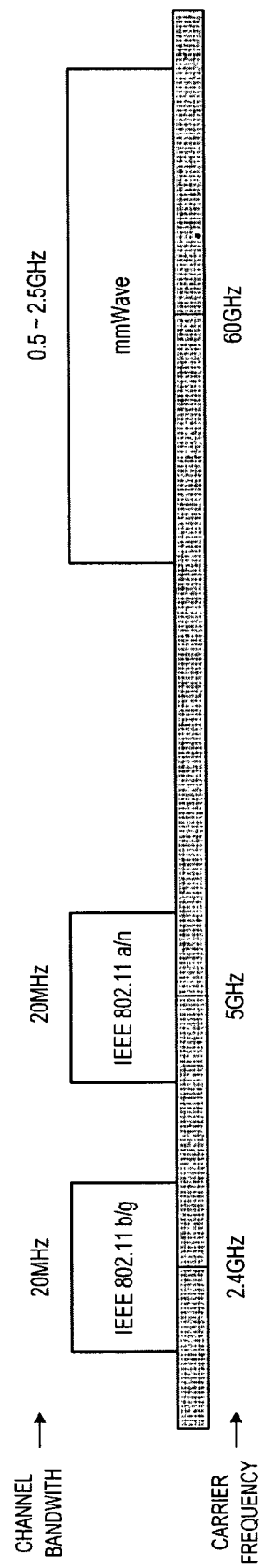
FIG. 1 is a diagram comparing frequency bands of IEEE 802.11 series of standards and mmWave.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Figure 2:
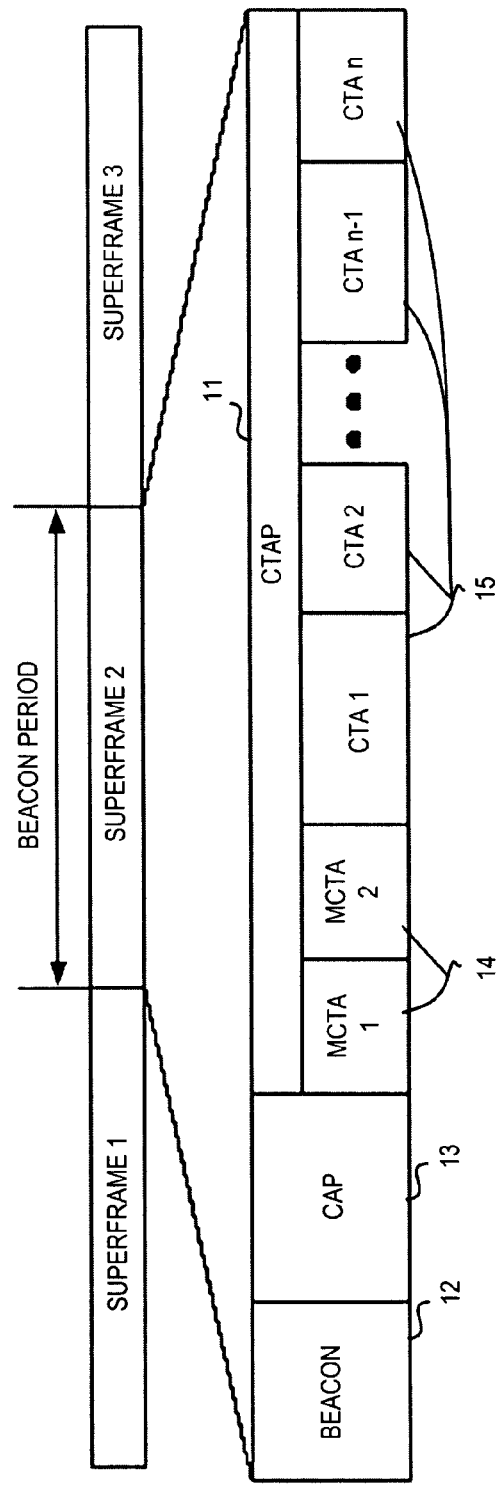
FIG. 2 illustrates a time division method according to an IEEE 802.15.3 standard.

FIG. 2 illustrates a time division method according to an IEEE 802.15.3 standard. Features of an IEEE 802.15.3 medium access control (MAC) include easy formation of a wireless network. In addition, the IEEE 802.15.3 MAC is not based on an access point, but on an ad hoc network known as "Piconet," which is centered on a Piconet coordinator. Referring to FIG. 2, time periods for exchanging data between devices are placed in a temporal layout structure, i.e., a superframe. The superframe includes a beacon 12 which contains control information, a contention access period (CAP) 13 for transmitting data through backoff, and a channel time allocation period (CTAP) 11 for transmitting data at an allocated time without contention. A contention-based access method is used in the CAP 13 and a management channel time allocation (MCTA) 14. Specifically, a carrier sense multiple access/collision avoidance (CSMA/CA) method is used in the CAP 13, and a slotted aloha method is used in the MCTA 14.

The CTAP 11 includes a plurality of channel time allocations (CTAs) in addition to the MCTA 14. The CTAs 15 are classified into dynamic CTAs and pseudo static CTAs. The position of the dynamic CTAs may change for each superframe. Therefore, if a superframe misses a beacon, it cannot use the dynamic CTAs. On the other hand, the position of the pseudo static CTAs is fixed. Therefore, even if a superframe misses a beacon, it can still use the pseudo static CTAs at a fixed position. However, if a superframe consecutively misses a beacon for more than a predetermined number of times corresponding to mMaxLostBeacons, the superframe cannot use the pseudo static CTAs.

As described above, since the IEEE 802.15.3 MAC is based on time division multiple access (TDMA) which can guarantee stable quality of service (QoS), it is suitable particularly for audio/video (AV) streaming in a home network. However, there is still room for improvement in order to transmit AV data in a high-frequency band of several tens of GHz.

Generally, a MAC frame exchanged between devices over a network consists of a data frame and a control frame.

The control frame denotes all frames excluding the data frame and assisting the transmission of the data frame. Examples of the control frame include an association request frame, a data slot request frame, a probe request frame, a coordinator handover request frame, and a response frame sent in response to the above frames. Specifically, the association request frame is used to request participation in a network formed by a network coordinator. The data slot request frame is used to request a data slot for transmitting isochronous data. The probe request frame is used to request a network search, and the coordinator handover request frame is used to hand over the role as a network coordinator. An acknowledgement (ACK) frame, which is sent to acknowledge proper receipt of a frame, is also an example of the control frame.

In the IEEE 802.15.3 standard, the size of the data frame is not much different from that of the control frame. The maximum size of the data frame is 2,048 bytes, and the size of a command frame is approximately tens through hundreds of bytes. However, when uncompressed AV data is transmitted in a band of several tens of GHz, the size of the data frame significantly increases while the size of the command frame remains unchanged. Therefore, it is inefficient to use the conventional IEEE 802.15.3 standard.

In the CAP 13 and the MCTA 14 of the conventional IEEE 802.15.3 standard, various control frames and an asynchronous data frame are in contention for access to a channel. Here, if the asynchronous data frame with relatively low significance wins the channel in more cases, the opportunity for transmitting a control frame required to transmit uncompressed isochronous data is reduced. In addition, although a data slot request frame, which is related to data slot allocation, and an association request frame, which is needed for a device to associate with a network, are control frames with relatively higher significance than other control frames, they cannot win the channel in a stable manner since they have to compete with other control frames during the same contention period. The problem is that if a device misses an opportunity to transmit/receive such important control data, an opportunity to transmit huge uncompressed AV data is blocked, thereby sharply reducing an overall network throughput.

In this regard, it is required to include a separate time period for transmitting a relatively significant control frame in a superframe. Since a plurality of devices included in a network also have to contend with each other during a time period allocated to a certain control frame, the time period is basically a contention period.

FIG. 3 schematically illustrates an environment to which an exemplary embodiment of the present invention is applied. Referring to FIG. 3, a network coordinator 100 and one or more devices, i.e., first through third devices 200a through 200c, form a network. The network coordinator 100 periodically broadcasts a superframe during a beacon period. The superframe is included in a beacon signal, and is broadcast and delivered to each of the first through third devices 200a through 200c through the beacon signal.

Accordingly, the first through third devices 200a through 200c may transmit a control frame, a data frame and an ACK frame during a content period or a contention-free period included in the superframe.

In order to associate with the network, the first device 200a, which initially did not belong to the network, has to transmit an association request frame to the network coordinator 100 during the contention period of the superframe through contention with the second and third devices 200b and 200c (operation ①) and receive an association response frame from the network coordinator 100 (operation ②).

An association request frame 40 may be configured as illustrated in FIG. 4. Like all other frames, the association request frame 40 includes an MAC header 100 and a payload 20. The payload 20 may be composed of a control type field 41, a length field 42, a device address field 43, a device information field 44, and an association timeout period (ATP) field 45.

The control type field 41 shows an identifier of a corresponding control frame, i.e., the association request frame 40, and the length field 42 records a total number of bytes of its subsequent fields, i.e., the device address field 43, the device information field 44, and the ATP field 45.

A hardware address (for example, an MAC address of maximum 8 bytes) of the first device 200a, which transmits the association request frame 40, is recorded in the device address field 43. In addition, the device information field 44 records various device information of the first device 200a, such as function, performance, capacity, and so on. Finally, the ATP field 45 shows a maximum period of time during which an association between the network coordinator 100 and the first device 200a can be maintained without communication. Therefore, if no communication is made during the maximum period of time, the association between the network coordinator 100 and the first device 200a is broken.

In response to the association request frame 40, the network coordinator 100 transmits an association response frame 50 to the first device 200a. FIG. 5 illustrates the configuration of the association response frame 50. A payload 20 of the association response frame 50 includes a control type field 51, a length field 52, a device address field 53, a device ID field 54, an ATP field 55, and a code field 56.

The control type field 51 shows an identifier of the association response frame 50, and the length field 52 records a total number of bytes of its subsequent fields, i.e., the device address field 53, the device ID field 54, the ATP field 55 and the code field 56. In addition, the device address field 53 records a hardware address of the first device 200a.

The device ID field 54 records a device ID used to identify a device existing in a network. Since the device ID recorded may be much smaller (e.g., 1 byte) than the size (e.g., 8 bytes) of the hardware address, an overhead, which may occur while devices communicate with each other, can be reduced.

A final timeout period determined by the network coordinator 200a is recorded in the ATP field 55. When the network coordinator 200a cannot support a requested timeout period, the final timeout period determined by the network coordinator 200a and recorded in the ATP field 55 illustrated in FIG. 4 may be different from the requested timeout period.

The code field 56 shows a value indicating approval or rejection to an association request. For example, 0 indicates approval, and each of 1 through 8 indicates a reason for rejection. The reasons for rejection may include reaching a maximum number of devices that can be associated with the network coordinator 100, a shortage of time slots that can be allocated, and poor channel conditions.

When the first device 200a receives approval for the association request through the association response frame 50, it becomes a member of the network. Then, if the first device 200a desires to transmit uncompressed AV data to the second device 200b, it has to request the network coordinator 100 for a data slot for transmitting the uncompressed AV data (operation ③ of FIG. 3).

The request for the data slot may be made using a data slot request frame 60 as illustrated in FIG. 6. A payload 20 of the data slot request frame 60 is composed of a control type field 61, a length field 62, and one or more request block fields 63 through 65. The control type field 61 and the length field 62 are similar to those included in other control frames.

Each of the request block fields 63 through 65, for example, the request block field 64, may be composed of a target number field 64*a*, which indicates the number of receiving devices, a target ID list field 64*b*, which lists device IDs of the receiving devices, a stream request ID field 64*c*, which identifies a version of the data slot request frame 60, a minimum time unit (TU) field 64*e*, which indicates a minimum size of a data slot that is to be requested, and a desired TU field 64*f* which indicates a device's desired size of a data slot.

Figure 7:
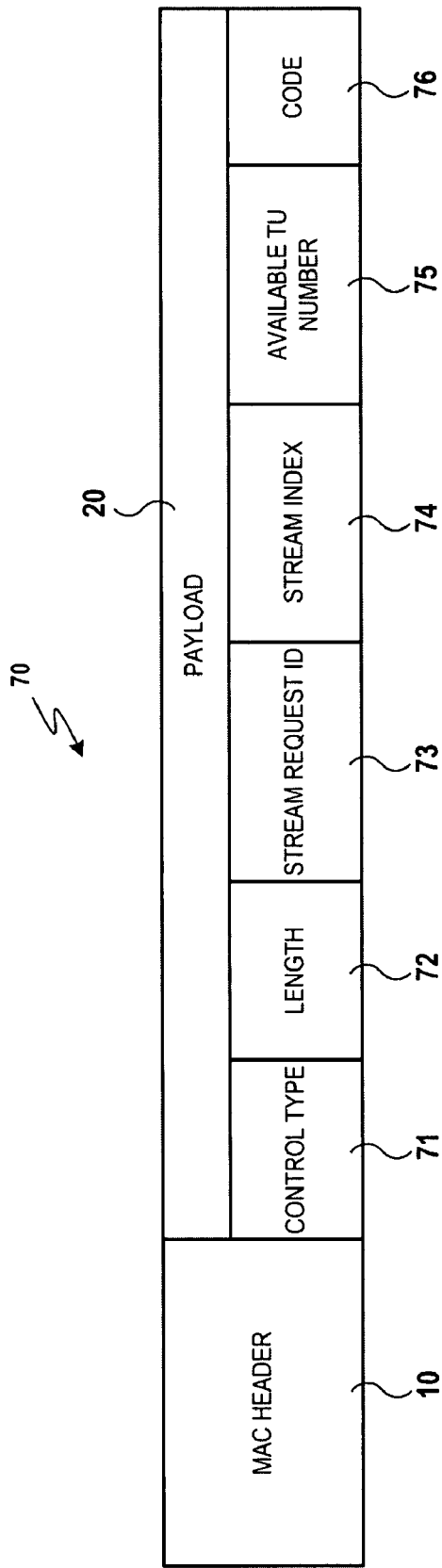
FIG. 7 illustrates the configuration of a data slot response frame according to an exemplary embodiment of the present invention.

If the first device 200*a* transmits the data slot request frame 60 during the contention period of the superframe through competition with the second and third devices 200*b* and 200*c* (operation ③), the network coordinator 100 transmits a data slot response frame 70 as illustrated in FIG. 7 to the first device 200*a* (operation ④).

A payload 20 of the data slot response frame 70 may be composed of a control type field 71, a length field 72, a stream request ID field 73, a stream index field 74, an available TU number field 75, and a code field 76.

The control type field 71, the length field 72, the stream request ID field 73, and the stream index field 74 are similar to those of the data slot request frame 60. The number of TUs finally allocated to a data slot by the network coordinator 100 is recorded in the available TU number field 75. The code field 76 shows a value indicating approval or rejection to a data slot request.

After transmitting the data slot response frame 70 to the first device 200*a*, the network coordinator 100 includes the superframe containing data slots allocated to the first through third devices 200*a* through 200*c* in a beacon signal and broadcasts the superframe to each of the first through third devices 200*a* through 200*c* through the beacon signal (operation ⑤).

If the first device 200*a* is allocated a data slot by the network coordinator 100 through the broadcast superframe, it may transmit uncompressed AV data to a receiving device, e.g., the second device 200*b*, during the allocated data slot (operation ⑥). After receiving the uncompressed AV data, the second device 200*b* may transmit an ACK frame to the second device 200*b* (operation ⑦). Characteristically, uncompressed AV data, even when having an error, does not greatly affect an image reproduced. Therefore, a No ACK policy, which does not use the ACK frame, may also be used. Even if the ACK frame is transmitted, it may not be transmitted during the data slot according to the present invention. In order to use the data slot to facilitate the transmission of uncompressed AV data, the ACK frame may be transmitted through contention during the contention period like other control frames.

FIGS. 8 through 13 illustrate the structures of superframes 80 through 130 according to various exemplary embodiments of the present invention. A superframe according to the present invention is divided into a beacon period, a contention period, and a contention-free period.

The contention period according to the present invention is distinguished from the contention period according to the conventional IEEE 802.15.3 standard in that the contention period according to the present invention is divided into time periods for control frames related to particular functions with high significance and time periods for control frames unrelated to the particular functions. In other words, the conventional contention period is simply a period during which corresponding frames contend with each other to win a channel regardless of time division. However, in the present invention, the contention period itself is temporally divided according to functions.

Figure 8:
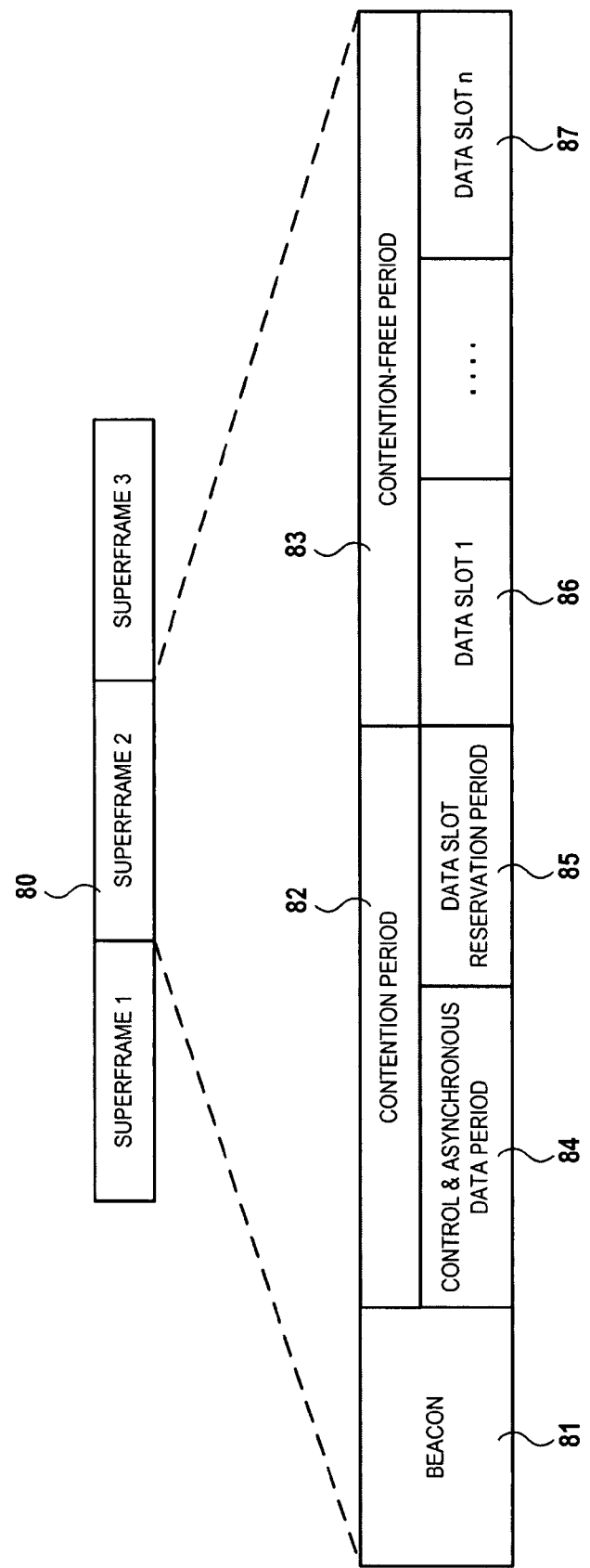
FIG. 8 illustrates the structure of a superframe according to a first exemplary embodiment of the present invention.

FIG. 8 illustrates the structure of the superframe 80 according to a first embodiment of the present invention.

Referring to FIG. 8, a contention period 82 is divided into a data slot reservation period 85 for a data slot request and response and a control and asynchronous data period 84 for transmitting or receiving a control frame and an asynchronous data frame which are not related to data slot reservation. Since the data slot request and response is an essential process for reserving a data slot needed to transmit uncompressed AV data, it is separated from the control and asynchronous data period 84. However, even if the data slot reservation period 85 is separated from the control and asynchronous data period 84, the slot reservation may not necessarily made during the data slot reservation period 85. The slot reservation may also be made during the control and asynchronous data period 84 through contention with other control frames.

The contention-free period 83 includes a plurality of data slots 86 and 87, and each of the data slots 86 and 87 is used to transmit uncompressed AV data.

Figure 9:
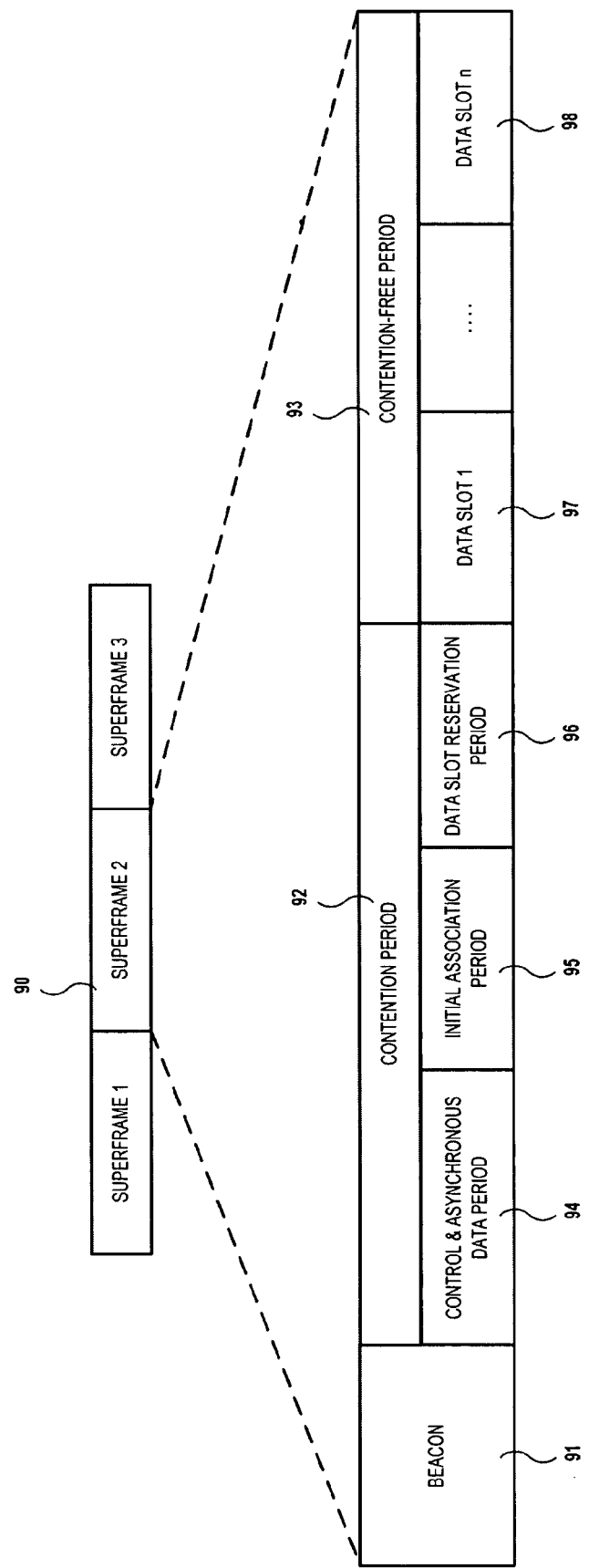
FIG. 9 illustrates the structure of a superframe according to a second exemplary embodiment of the present invention.

FIG. 9 illustrates the structure of the superframe 90 according to a second embodiment of the present invention.

Unlike the contention period 82 of the superframe 80 illustrated in FIG. 8, a contention period 92 of the superframe 90 illustrated in FIG. 9 includes an initial association period 95 in addition to a control and asynchronous data period 94 and a data slot reservation period 96. The initial association period 95 is used to transmit/receive a device association request and response which is the most important after the data slot reservation. Therefore, a device association request frame or a response frame to the device association request frame may be transmitted/received exclusively during the initial association period 95.

Figure 10:
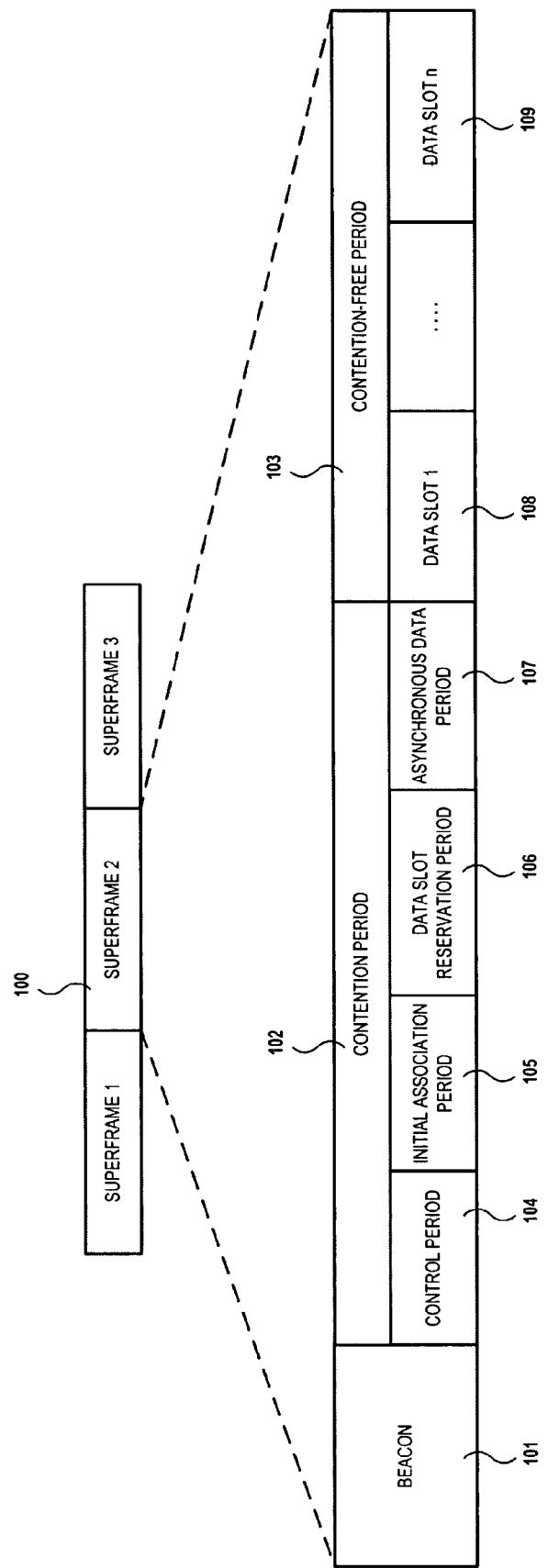
FIG. 10 illustrates the structure of a superframe according to a third exemplary embodiment of the present invention.

FIG. 10 illustrates the structure of the superframe 100 according to a third embodiment of the present invention.

Unlike in the superframe 90 illustrated in FIG. 9, a control period 104 and an asynchronous data period 107 are separated from each other in the superframe 100 illustrated n FIG. 10. The control period 104 is a contention period for transmitting control data which is not related to the initial association and data slot reservation, and the asynchronous data period 107 is a contention period for transmitting asynchronous data (e.g., compressed AV data) excluding isochronous uncompressed AV data.

Figure 11:
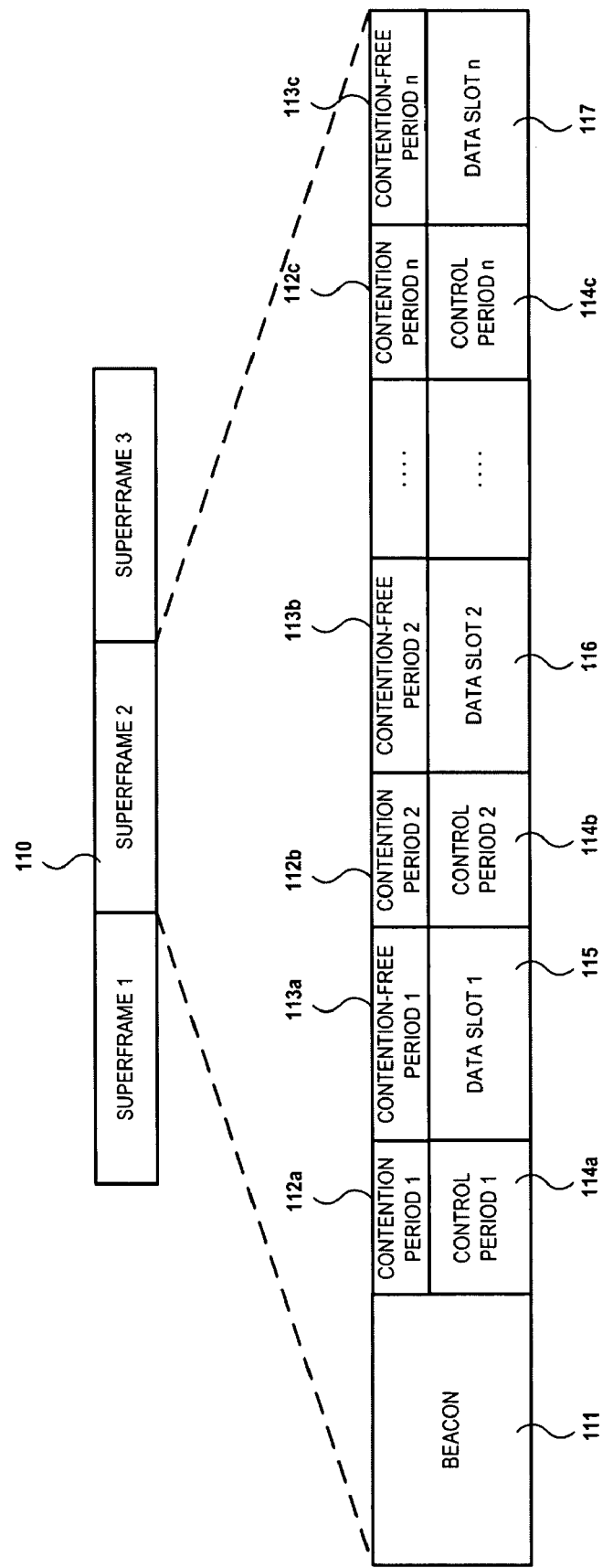
FIG. 11 illustrates the structure of a superframe according to a fourth exemplary embodiment of the present invention.

FIG. 11 illustrates the structure of the superframe 110 according to a fourth embodiment of the present invention. In the fourth embodiment of the present invention, a plurality of control periods 114*a* through 114*c* are distributed between a plurality of data slots 115 through 117. The control periods 114*a* through 114*c* are contention periods, and the data slots 115 through 117 are contention-free periods. Therefore, it can be understood that the contention periods and the contention-free periods are arranged in a distributed manner. Through such distributed arrangement, the size of a buffer required of a device, which tries to transmit uncompressed AV data, can be reduced.

Figure 12:
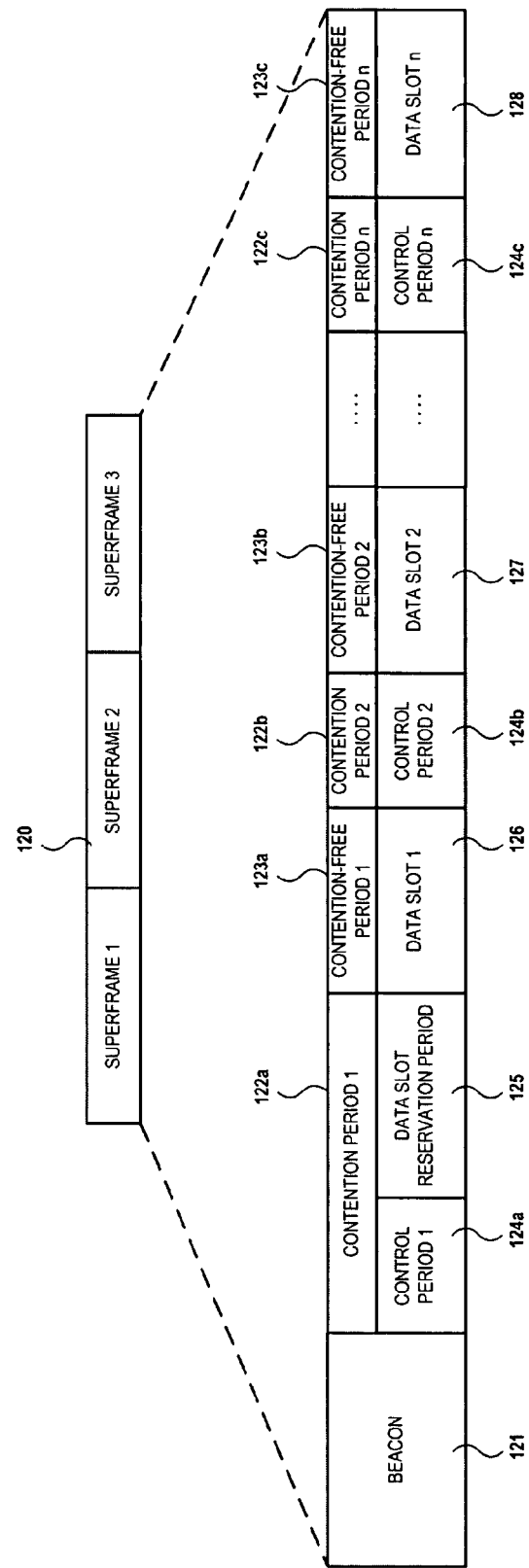
FIG. 12 illustrates the structure of a superframe according to a fifth exemplary embodiment of the present invention.

FIG. 12 illustrates the structure of the superframe 120 according to a fifth embodiment of the present invention.

Unlike in the superframe 110 illustrated in FIG. 11, an initial contention period 122*a* of the superframe 120 illustrated in FIG. 12 is divided into a control period 124*a* and a data slot reservation period 125. As described above, the data slot reservation process is a prerequisite for transmitting uncompressed AV data. Due to such importance of the data slot reservation process, a separate period is allocated to the data slot reservation process.

Figure 13:
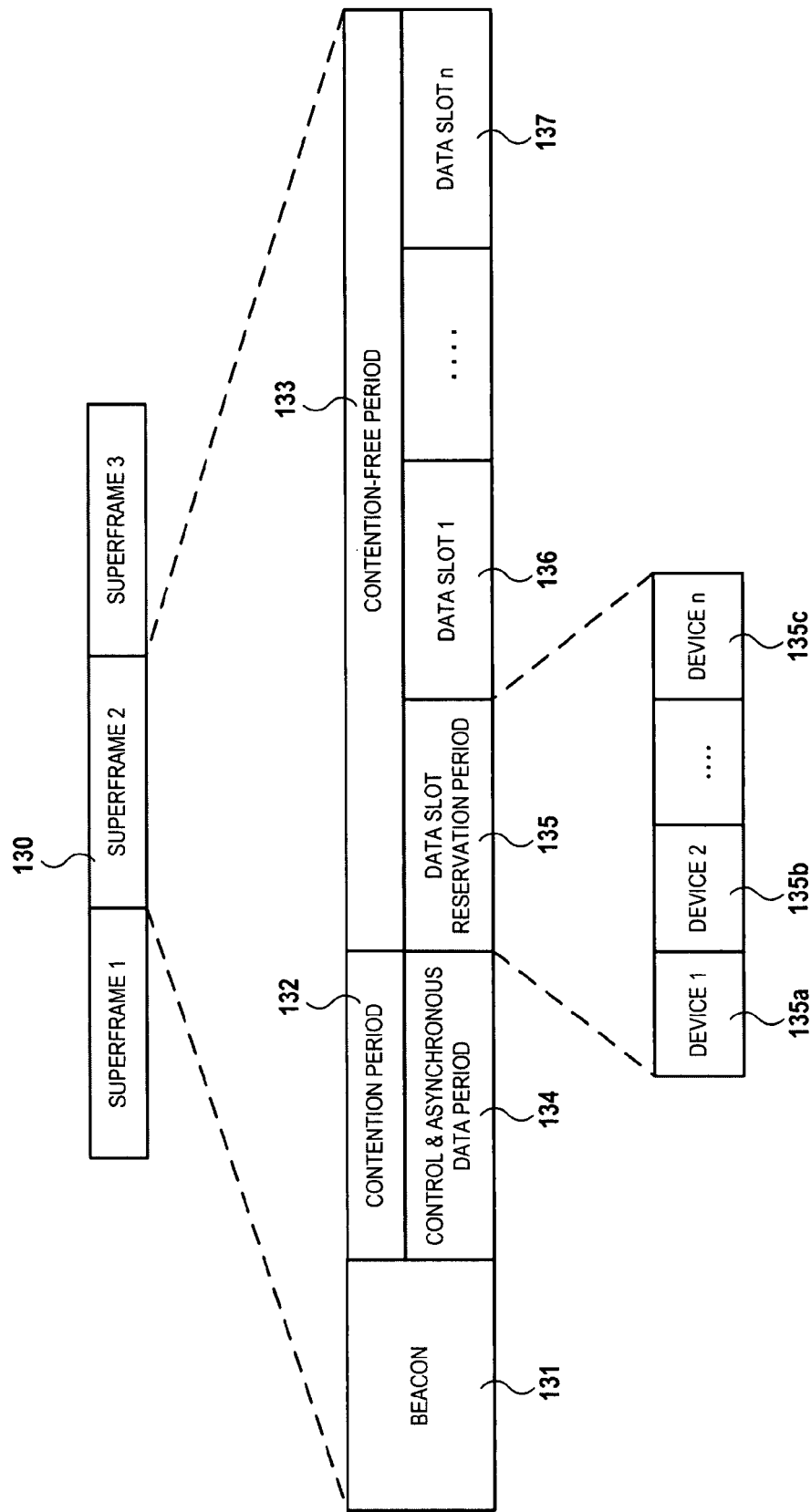
FIG. 13 illustrates the structure of a superframe according to a sixth exemplary embodiment of the present invention.

FIG. 13 illustrates the structure of the superframe 130 according to a sixth embodiment of the present invention.

The superframe 130 of FIG. 13 is different from the superframe 80 of FIG. 8 in that a data slot reservation period 130 of the superframe 130 is included in a contention-free period 133 instead of a contention period 132. In the first embodiment of the present invention illustrated in FIG. 8, the data slot reservation period 85 is included in the contention period 82. Therefore, some uncompetitive devices may not even have an opportunity to transmit a data slot request frame.

In the sixth embodiment of the present invention, however, the network coordinator 100, which is aware of the number of devices associated with the network, informs an equal number of data slot reservation periods to the number of the devices associated with the network when broadcasting the superframe 130. For example, if n devices are associated with the network, the data slot reservation period 130 is divided into n time periods. Accordingly, time periods 135a through 135c needed for the n devices to make reservations for data slots, respectively, are included in the superframe 130. Consequently, all devices are guaranteed with an opportunity for transmitting a data slot request frame to a make data slot reservation.

Figure 14:
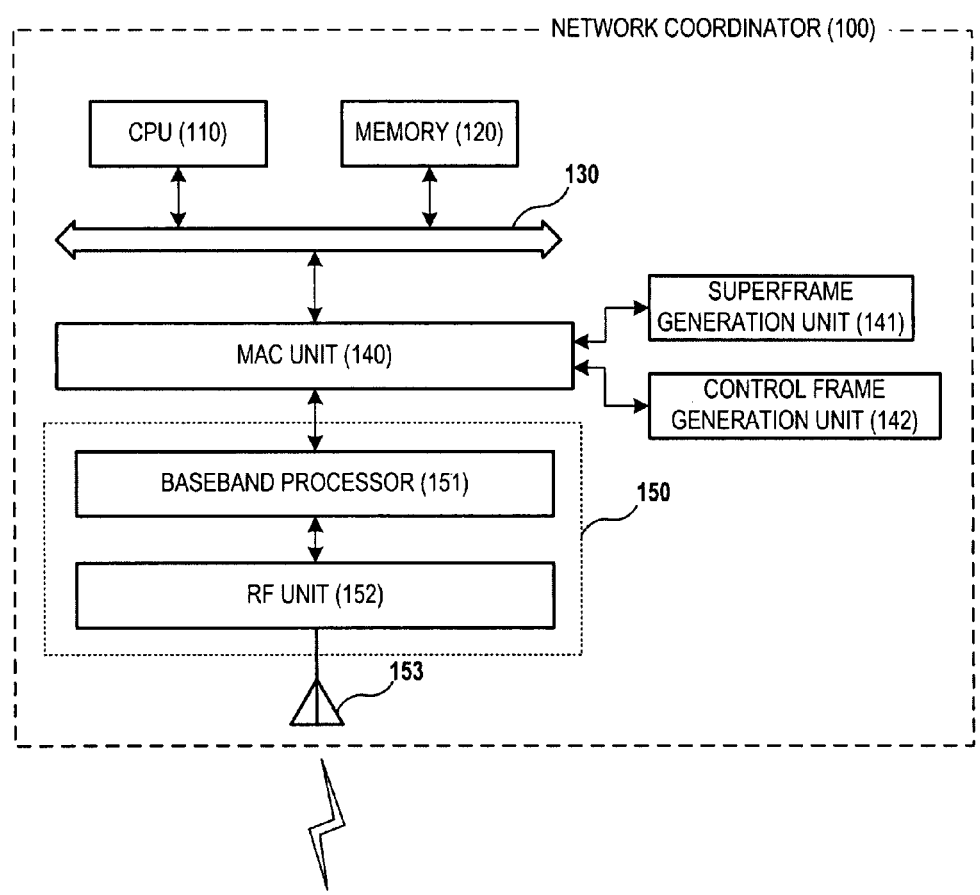
FIG. 14 is a block diagram of a network coordinator according to an exemplary embodiment of the present invention.

FIG. 14 is a block diagram of a network coordinator 100 according to an embodiment of the present invention.

Referring to FIG. 14, the network coordinator 100 may include a central processing unit (CPU) 110, a memory 120, an MAC unit 140, a physical layer (PHY) unit 150, a superframe generation unit 141, a control frame generation unit 142, and an antenna 153.

The CPU 110 controls other elements connected to a bus 130 and performs necessary processing in an upper layer of an MAC layer. Accordingly, the CPU 110 processes reception data (a reception MAC service data unit (MSDU)) provided by the MAC unit 140 or generates transmission data (a transmission MSDU) and transmits the generated transmission data to the MAC unit 140.

The memory 120 stores the processed reception data or temporarily stores the generated transmission data. The memory 120 may be a nonvolatile memory device such as a read-only memory (ROM), a programmable read-only memory (PROM), an erasable programmable read-only memory (EPROM), an electrically erasable programmable read-only memory (EEPROM) or a flash memory, a volatile memory device such as a random access memory (RAM), a storage medium such as a hard disk or an optical disk, or may be implemented in different forms known to the art to which the present invention pertains.

The MAC unit 140 adds an MAC header to the MSDU, i.e., multimedia data that is to be transmitted, which is provided by the CPU 110, generates an MAC protocol data unit (MPDU), and transmits the generated MPDU through the PHY unit 150. In addition, the MAC unit 140 removes an MAC header from an MPDU received from the PHY unit 150.

As described above, the MPDU transmitted by the MAC unit 140 includes a superframe transmitted during a beacon period, and the MPDU received by the MAC unit 140 includes an association request frame, a data slot request frame, and other various control frames.

The superframe generation unit 141 generates any one of the superframes 80 through 130 illustrated in FIGS. 8 through 13 and provides the generated superframe to the MAC unit 140. The control frame generation unit 142 generates an association request frame, a data slot request frame and other various control frames, and provides the generated frames to the MAC unit 140.

The PHY unit 150 adds a signal field and a preamble to the MPDU provided by the MAC unit 140 and generates a PPDU, i.e., a data frame. Then, the PHY unit 150 converts the generated PPDU into a wireless signal and transmits the wireless signal through the antenna 153. The PHY unit 150 is divided into a baseband processor 151 processing a baseband signal and a radio frequency (RF) unit 152 generating a wireless signal from the processed baseband signal and transmits the wireless signal over the air using the antenna 153.

Specifically, the baseband processor 151 performs frame formatting and channel coding, and the RF unit 152 performs amplification of an analog wave, analog/digital signal conversion, and modulation.

Figure 15:
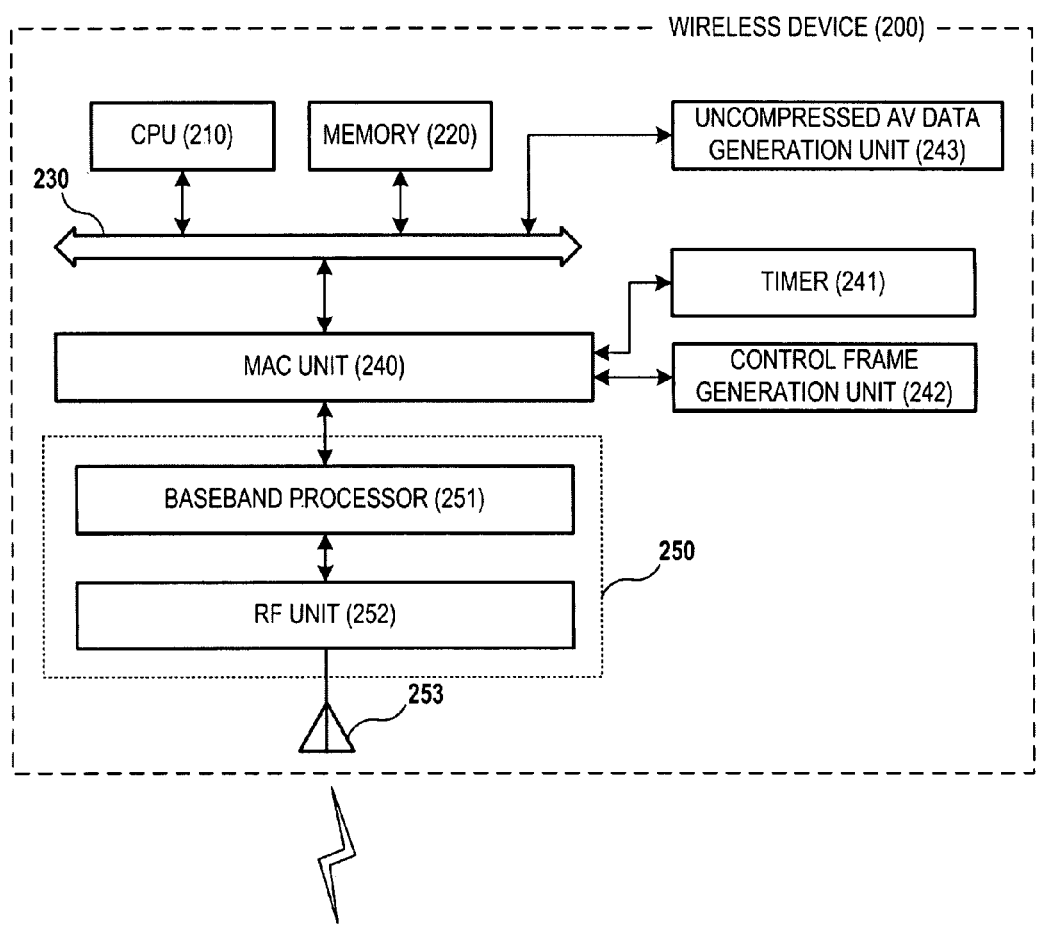
FIG. 15 is a block diagram of a wireless device according to an exemplary embodiment of the present invention.

FIG. 15 is a block diagram of a wireless device 200 according to an embodiment of the present invention. Basic functions of an MAC unit 240, a memory 220, and a PHY unit 250 included in the wireless device 200 are similar to those of the MAC unit 140, the memory 120 and the PHY unit 150 included in the network coordinator 100.

A timer 241 is used to identify a start time and an end time of a contention period or a contention-free period included in a superframe. A control frame generation unit 242 generates various control frames, such as an association request frame and a data slot request frame, and provides the generated control frames to the MAC unit 240.

An uncompressed AV data generation unit 243 records AV data in an uncompressed form and generates uncompressed AV data. For example, the uncompressed AV data generation unit 243 records video data composed of red (R), green (G) and blue (B) component values.

The MAC unit 240 adds an MAC header to uncompressed AV data or a control frame that is provided, generates an MPDU, and transmits the MPDU through the PHY unit 250 when a corresponding time of a superframe arrives.

As described above, according to the present invention, uncompressed AV data can be efficiently transmitted using mmWave in a band of several tens of GHz.

Each component described above with reference to FIGS. 14 and 15 may be implemented as a software component, such as a task performed in a predetermined region of a memory, a class, a subroutine, a process, an object, an execution thread or a program, or a hardware component, such as a Field Programmable Gate Array (FPGA) or Application Specific Integrated Circuit (ASIC). In addition, the components may be composed of a combination of the software and hardware components. The components may be reside on a computer-readable storage medium or may be distributed over a plurality of computers.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation.

What is claimed is:

1. A data slot allocation method used to transmit uncompressed audio/video (AV) data, the method comprising:
transmitting a first superframe during a first beacon period;
receiving a data slot request frame requesting a data slot for transmitting the uncompressed AV data from at least one wireless device, which belongs to a network, during a data slot reservation period included in the first superframe;
transmitting a response frame to the at least one wireless device during the data slot reservation period in response to the data slot request frame; and
transmitting a second superframe including at least one data slot allocated to the at least one wireless device during a second beacon period,
wherein a plurality of contention access periods in which the at least one wireless device transmits data through backoff are distributed between a plurality of data slots in the first superframe, the plurality of data slots respectively indicating a plurality of periods during which the at least one wireless device is assigned to transmit data over the network, the plurality of contention access periods are not placed adjacent each other in the first superframe, and communication with the at least one wireless device is carried out using a carrier frequency of 60 GHz.

2. The method of claim 1, further comprising before the transmitting of the first superframe:
receiving a network association request frame from the at least one wireless device; and
transmitting a response frame to the at least one wireless device in response to the network association request frame.

3. The method of claim 1, wherein the first superframe comprises:
a first contention period among the plurality of contention access periods; and
a first contention-free period,
wherein the first contention period comprises a period for transmitting or receiving a first control frame and first asynchronous data and the data slot reservation period, and the first contention-free period comprises allocated data slots, and
the second superframe comprises:
a second contention period; and
a second contention-free period,
wherein the second contention period comprises a period for transmitting or receiving a second control frame and second asynchronous data and data slot reservation period of the second superframe, and the second contention-free period comprises the allocated at least one data slot.

4. The method of claim 3, wherein the first contention period further comprises an initial association period during which the at least one wireless device can transmit or receive a control frame to associate with the network.

5. The method of claim 1, wherein the data slot reservation period is a first data slot reservation period, the first superframe comprises:
a first contention period among the plurality of contention access periods; and
a first contention-free period,
the first contention period comprising a first control period for transmitting or receiving a first control frame, the first data slot reservation period and a first period for transmitting asynchronous data, and the first contention-free period comprising first allocated data slots, and
the second superframe comprises:
a second contention period; and
a second contention-free period,
wherein the second contention period comprising a second control period for transmitting or receiving a second control frame, a second data slot reservation period and a second period for transmitting asynchronous data, and the second contention-free period comprising the allocated at least one data slot.

6. The method of claim 5, wherein the first contention period further comprises an initial association period during which the at least one wireless device can transmit or receive a control frame to associate with the network.

7. The method of claim 1, wherein the first data slot reservation period is a contention period and is placed adjacent to one of the distributed plurality of control periods.

8. The method of claim 1, wherein the first data slot reservation period is a contention-free period and is placed adjacent to any one of the plurality of data slots.

9. The method of claim 8, wherein the first data slot reservation period comprises temporally divided periods respectively for the at least one wireless device.

10. A method of transmitting uncompressed audio/video (AV) data, the method comprising:
receiving a first superframe from a network coordinator during a first beacon period;
transmitting a data slot request frame requesting a data slot for transmitting the uncompressed AV data from at least one wireless device, which belongs to a network, to the network coordinator during a data slot reservation period included in the first superframe;
receiving a second superframe including at least one data slot allocated to the at least one wireless device by the network coordinator during a second beacon period; and
transmitting uncompressed AV data to another wireless device during a period corresponding to the at least one data slot,
wherein a plurality of contention access periods in which the at least one wireless device transmits data through backoff are distributed between a plurality of data slots in the first superframe, the plurality of data slots respectively indicating a plurality of periods during which the at least one wireless device is assigned to transmit data over the network, the plurality of contention access periods are not placed adjacent each other in the first superframe, and communication with the network coordinator is carried out using a carrier frequency of 60 GHz.

11. The method of claim 10, further comprising receiving a response frame from the network coordinator during the data slot reservation period in response to the data slot request frame.

12. The method of claim 10, wherein the first superframe comprises:
a first contention period among the plurality of contention access periods; and
a first contention-free period,
the first contention period comprising a first period for transmitting or receiving a first control frame and first asynchronous data and the data slot reservation period, and the first contention-free period comprising data slots;
the second superframe comprises:
a second contention period; and
a second contention-free period,
the second contention period comprising a second period for transmitting or receiving a second control frame and second asynchronous data and a second data slot reservation period, and the second contention-free period comprising the allocated at least one data slot.

13. The method of claim 12, wherein the first contention period further comprises an initial association period during which the at least one wireless device can transmit or receive a control frame to associate with the network.

14. The method of claim 10, wherein the data slot reservation period is a first data slot reservation period, the first superframe comprises:
a first contention period among the plurality of contention access periods; and
a first contention-free period,
the first contention period comprising a first control period for transmitting or receiving a first control frame, the first data slot reservation period and a first period for transmitting asynchronous data, and the first contention-free period comprising first allocated data slots, and the second superframe comprises:
a second contention period; and
a second contention-free period,
the second contention period comprising a second control period for transmitting or receiving a second control frame, a second data slot reservation period and a second period for transmitting asynchronous data, and the second contention-free period comprising the allocated at least one data slot.

15. The method of claim 14, wherein the first contention period further comprises an initial association period during which the at least one wireless device can transmit or receive a control frame to associate with the network.

16. The method of claim 10, wherein the first data slot reservation period is a contention period and is placed adjacent to one of the distributed plurality of control periods.

17. The method of claim 10, wherein the first data slot reservation period is a contention-free period and is placed adjacent to any one of the plurality of data slots.

18. The method of claim 17, wherein the first data slot reservation period comprises temporally divided periods respectively for the at least one wireless device.

19. A data slot allocation apparatus used to transmit uncompressed audio/video (AV) data, the apparatus comprising:
   a unit which transmits a first superframe during a first beacon period;
   a unit which receives a data slot request frame requesting a data slot for transmitting the uncompressed AV data from at least one wireless device, which belongs to a network, during a data slot reservation period included in the first superframe;
   a unit which transmits a response frame to the at least one wireless device during the data slot reservation period in response to the data slot request frame; and
   a unit which transmits a second superframe including at least one data slot allocated to the at least one wireless device during a second beacon period,
   wherein a plurality of contention access periods in which the at least one wireless device transmits data through backoff are distributed between a plurality of data slots in the first superframe, the plurality of data slots respectively indicating a plurality of periods during which the at least one wireless device is assigned to transmit data over the network, the plurality of contention access periods are not placed adjacent each other in the first superframe, and communication with the at least one wireless device is carried out using a carrier frequency of 60 GHz.

20. An apparatus for transmitting uncompressed audio/video (AV) data, the apparatus comprising:
   a unit which receives a first superframe from a network coordinator during a first beacon period;
   a unit which transmits a data slot request frame requesting a data slot for transmitting the uncompressed AV data from at least one wireless device, which belongs to a network, to the network coordinator during a data slot reservation period included in the first superframe;
   a unit which receives a second superframe including at least one data slot allocated to the at least one wireless device by the network coordinator during a second beacon period; and
   a unit which transmits uncompressed AV data to another wireless device during a period corresponding to the allocated at least one data slot,
   wherein a plurality of contention periods in which the at least one wireless device transmits data through backoff are distributed between a plurality of data slots in the first superframe, the plurality of data slots respectively indicating a plurality of periods during which the at least one wireless device is assigned to transmit data over the network, the plurality of contention access periods are not placed adjacent each other in the first superframe, and communication with the network coordinator is carried out using a carrier frequency of 60 GHz.

* * * * *